United States Patent [19]

Cowles et al.

[11] Patent Number: 4,797,444

[45] Date of Patent: Jan. 10, 1989

[54] WATERBORNE PIGMENTED ACRYLIC HYDROSOL COATING COMPOSITION AND PROCESS

[75] Inventors: Richard A. Cowles, Perrysburg, Ohio; Nick Georgalas, Chappaqua, N.Y.; Shailesh C. Shah, Paramus, N.J.

[73] Assignee: BASF Corporation, Clifton, N.J.

[21] Appl. No.: 10,452

[22] Filed: Feb. 3, 1987

[51] Int. Cl.$^4$ ............................ C08J 3/02; C08K 3/20
[52] U.S. Cl. ..................................... 524/501; 524/413; 524/451; 524/556
[58] Field of Search ................ 524/501, 413, 451, 556

[56] References Cited

U.S. PATENT DOCUMENTS

| | | | |
|---|---|---|---|
| 3,705,124 | 12/1972 | Selby et al. | 524/238 |
| 3,943,187 | 3/1976 | Wu | 523/412 |
| 4,021,396 | 5/1977 | Wu | 523/412 |
| 4,124,555 | 11/1978 | Gross et al. | 524/317 |
| 4,151,143 | 4/1979 | Blank et al. | 524/533 |
| 4,230,609 | 10/1980 | Burroway et al. | 524/364 |
| 4,423,165 | 12/1983 | Harper et al. | 524/501 |
| 4,450,253 | 5/1984 | Suk | 524/378 |
| 4,477,609 | 10/1984 | Aluotto et al. | 523/411 |
| 4,489,188 | 12/1984 | Jones et al. | 524/292 |

FOREIGN PATENT DOCUMENTS

| | | | |
|---|---|---|---|
| 1114133 | 1/1968 | United Kingdom . | |
| 1109656 | 1/1968 | United Kingdom . | |
| 1199157 | 7/1970 | United Kingdom | 524/501 |

OTHER PUBLICATIONS

Herbert P. Beardsley and Richard N. Selby; "Acrylic Hydrosols-A New Concept in Aqueous Coating Systems", Journal of Paint Technology, vol. 40, No. 521, Jun. 1968, pp. 263-270.

*Primary Examiner*—Herbert J. Lilling
*Attorney, Agent, or Firm*—Harness Dickey & Pierce

[57] ABSTRACT

A waterborne pigmented liquid coating composition and method of making and using same which is substantially devoid of any surfactant dispersing and/or emulsifying agents thereby substantially eliminating flash-rusting upon application to ferrous substrates and improved resistance to deterioration on exposure to high moisture environments. The coating composition contains as its essential constituents one or a combination or mixture of substantially uniformly dispersed pigment particles, a film forming constituent comprising a mixture of substantially uniformly dispersed acrylic hydrosol particles and an aqueous soluble salt of a dispersant resin having acid functionality, and a liquid constituent comprising a mixture of water and organic solvents, the organic solvents functioning as coalescing agents for the film forming constituents.

7 Claims, No Drawings

WATERBORNE PIGMENTED ACRYLIC HYDROSOL COATING COMPOSITION AND PROCESS

BACKGROUND OF THE INVENTION

The present invention broadly relates to an improved liquid coating composition and more particularly to an improved waterborne pigmented acrylic hydrosol coating composition and process which overcomes many of the problems and disadvantages associated with acrylic hydrosol compositions of the types heretofore known.

A variety of waterborne liquid coating compositions incorporating acrylic copolymers including acrylic hydrosols have heretofore been used or proposed for use. Typical of such coating formulations are those described in U.S. Pat. Nos. 3,705,124; 3,943,187; and 4,477,609; and British Pat. Nos. 1,114,133 and 1,109,656. A method for preparing acrylic hydrosols suitable for forming waterborne acrylic coating compositions is described in a publication entitled "Acrylic Hydrosols-A New Concept in Aqueous Coating Systems" by Beardsley et al, published in Volume 40, No. 521, June, 1968 of the Journal of Paint Technology, pages 263–270. A continuing problem associated with such waterborne liquid acrylic coating compositions of the types heretofore known has been the inclusion of surfactant-type dispersing and/or emulsifying agents to provide for a stable coating composition in which the surfactant upon drying of the coating composition is incorporated into the resultant polymeric film. The presence of such surfactants in the liquid coating composition can result in flash rusting of corrosion susceptible substrates upon application and the presence of such surfactants in the resultant film renders them moisture sensitive and therefore susceptible to deterioration upon exposure to high moisture-containing environments such as, for example, those encountered by exterior coatings for automotive applications.

The present invention overcomes such disadvantages in providing a waterborne pigmented acrylic hydrosol coating composition and method of preparing such composition which is substantially devoid of any surfactant-type dispersants and/or emulsifying agents providing a liquid coating composition having excellent physical properties, which is resistant to rust formation when applied to corrosion susceptible substrates, which can be directly applied to ferrous substrates without causing flash rusting upon application and can also be applied over rusted surfaces with good adhesion, which produces polymeric films that are resistant to deterioration upon exposure to high moisture environments, which are compatible with and can be directly applied over painted surfaces without lifting of the underlying coating and which in turn is receptive to a further topcoating as may be desired or required in some instances, and which possesses excellent filling and sealing characteristics when applied to previously painted surfaces. The coating composition of the present invention is further characterized by its versatility enabling pigmentation thereof with any one or combinations of conventionally employed pigmenting agents of the types used in waterborne coating systems and which can be formulated for air-dry as well as moderate or high temperature bake systems.

SUMMARY OF THE INVENTION

The benefits and advantages of the present invention are achieved in accordance with the composition aspects thereof by a waterborne pigmented coating composition comprising one or a combination or mixture of substantially uniformly dispersed pigment particles, a film forming constituent comprising a mixture of uniformly dispersed acrylic hydrosol particles and an aqueous soluble salt of a dispersant polymer having acid functionality, and a liquid constituent comprising a mixture of water and organic solvents, the organic solvents functioning as coalescing agents for the film forming constituents. The essential ingredients of the coating composition are controlled so as to provide a liquid coating composition having the desired viscosity to achieve optimum coating characteristics depending upon the specific coating technique employed providing a substantially uniform continuous film which possesses excellent physical properties and is adherent to the substrate over which it is applied.

In accordance with the process aspects of the present invention, a process is disclosed by which an adherent substantially continuous acrylic polymeric film is applied to a substrate employing the coating composition as previously described. Additionally, a process is disclosed whereby a liquid acrylic hydrosol coating composition is prepared to provide for a substantially uniform stable dispersion without necessitating the use of detrimental surfactant-type dispersing agents and/or emulsifying agents achieving a resultant polymeric film which is more resistant to high moisture environments.

Additional benefits and advantages of the present invention will become apparent upon a reading of the description of the preferred embodiments taken in conjunction with the specific examples provided.

DESCRIPTION OF THE PREFERRED EMBODIMENTS

In accordance with the composition aspects of the present invention, the improved waterborne pigmented liquid coating composition contains as its essential ingredients, an aqueous based solvent containing a liquid organic coalescing agent, a film forming constituent comprising a mixture .of substantially uniformly dispersed acrylic hydrosol particles and an aqueous soluble salt of a dispersant polymer having acid functionality and a pigment or mixture of pigments comprising pigment-grade particles substantially uniformly dispersed throughout the solvent and film forming constituents. The coating formulation is further characterized as being substantially devoid of any surfactant-type dispersants and/or emulsifying agents.

The acrylic hydrosol comprises the primary film-forming ingredient of the coating composition and comprises an aqueous dispersion of particles of colloidal dimensions comprised of acrylic copolymers and/or interpolymers. Such acrylic polymers are typically comprised of a polymerization of acrylic monomers such as methyl methacrylate, ethyl acrylate and acrylic acid in controlled proportions to preferably provide a film hardness of the resultant dried film to achieve optimum physical properties on the substrate coated. A method of preparing such acrylic hydrosols is generally described in U.S. Pat. Nos. 3,705,124 and 3,943,187 as well as in the previously mentioned publication appearing in Volume 40, of the Journal of Paint Technology, June, 1968, the teachings of which are incorporated herein by reference. Generally speaking, as known in the art, the acrylic hydrosol is prepared by polymerizing the monomeric constituents to form an acrylic polymer in water miscible solvents and thereafter neutralizing the polymer with a base such as an amine whereby the composition is thereafter inverted into an aqueous system by the addition of water forming stable dispersion of colloidal particles of the acrylic copolymer in a waterborne solvent. Typically, acrylic hydrosols usually contain a dispersion of the acrylic polymer particles in an amount of about 20% to about 40% by weight in a liquid solvent comprising predominantly water and a coalescing solvent. Such hydrosols are further characterized as having extremely fine-sized polymer particles of colloidal dimensions with diameters generally being of a size less than about 0.05 microns. Because of the fine particle size, such hydrosols are inherently stable and do not require the use of stabilizing and/or dispersant agents such as surfactants or the like. The coating composition generally contains the hydrosol particles within a range of about 5% to about 40% by weight.

The coalescing solvent or softening agent is advantageously employed in the polymerization medium for the preparation of the hydrosol which subsequently is incorporated as a portion of the waterborne solvent system. The coalescing agent performs the function of a temporary plasticizer during the drying of the liquid film effecting a coalescence of the indivdiual hydrosol particles into a substantially uniform and continuous film. Preferably, such coalescing agents are of a volatile type whereby evaporation thereof occurs during the drying of the liquid coating system thereby producing a final polymeric film substantially devoid of such coalescing solvents achieving desired physical properties of the film. Typical of such coalescing agents are organic compounds such as alcohols, ethers, esters, glycol ethers, polyols and the like. A particularly satisfactory coalescing agent comprises diacetone alcohol.

The liquid coating composition of the present invention generally contains the waterborne solvent comprising primarily water with a lesser proportion of organic coalescing agents or solvents. The waterborne solvent portion usually comprises from about 35% up to about 65% by weight of the final coating composition with amounts ranging from about 50% up to about 60% being preferred. The particular concentration of the solvent constituent will vary to achieve the desired viscosity of the coating composition in consideration of the manner by which the coating composition is to be applied to a substrate, such as by, for example, spraying, flooding, dipping, brushing, or the like.

A further essential ingredient of the coating composition of the present invention is a finely particulated solid pigment or mixtures of pigments of the various types conventionally employed in coating compositions. Such pigments impart opacity, workability, durability and a decorative appearance to the final dried coating film and can also serve as extenders and to impart coloration to the resultant film. Typical of suitable pigments which can be satisfactorily employed are magnesium silicate, aluminum silicate, calcium carbonate, barium sulfate, titanium dioxide, carbon black, iron oxide, phthalocyanines, quinacridones, Azos, Indos, chromates, and the like. It is also contemplated that metal oxide encapsulated mica pigments can be employed in such coating compositions to impart extraordinary esthetic properties thereto. Typical of such metal oxide encapsulated mica pigments are those as described in U.S. Pat. Nos. 4,499,143; 4,517,249; 4,539,258; 4,547,410; 4,551,491; 4,598,015; 4,598,020; 4,605,687; and 4,615,940; the teachings of which are incorporated herein by reference. Generally, it is undesirable to include metallic flake pigments such as an aluminum flake pigment because of their reactivity with the waterborne solvent. While such pigments can be employed if the coating composition is to be used shortly after preparation, their use is generally undesirable when prolonged storage of the formulation is anticipated.

The pigment concentration in the coating compositions of the present invention can generally range from about 0.5% up to about 40% by weight with concentrations ranging from about 10% up to about 35% by weight being more usual.

A further essential ingredient of the coating composition of the present invention comprises an aqueous soluble salt of a dispersant polymer having acid functionality which serves the dual function of enabling the preparation of a finely dispersed and stable dispersion of the pigment in the grind or mill portion of the coating formulation as well as an ultimate ingredient of the final dried polymeric film. The dispersant polymer may typically comprise an acrylic polymer, a polyester polymer, an epoxy ester polymer, an alkyd polymer or an oil modified urethane polymer having acid functionality which normally are water insoluble. However, solubility in the waterborne solvent can be provided by converting the polymer to a salt by neutralization with a base such as ammonium hydroxide or amines. For air-dry systems adapted to be dried under ambient temperature conditions, a relatively volatile base should be employed such as ammonia or triethylamine of which ammonia comprises the preferred material. For coating systems designed to be dried by means of baking at temperatures ranging from about 140° F. up to about 325° F., for example, less volatile amines can be used such as dimethylamino ethanol, morpholine, ethylenediamine, and the like. In accordance with the foregoing mechanism, the dispersant polymer is rendered water soluble during formulation and application of the liquid coating composition but is again rendered water insoluble by volatilization of the neutralizing base such as ammonia, during the air dry or bake-dry stage of the coating wherein the dispersant polymer itself becomes a constituent of the final polymeric film. A particularly satisfactory dispersant resin comprises a thermosettable acrylic resin available as a solution in an organic solvent such as n-propanol containing 65% by weight polymer and the balance solvent. The acrylic resin solution is available from Reichold Chemicals, Inc. under the brand designation Synthemul resin ® 40-425.

The quantity of the dispersant resin employed in the coating formulation will vary in consideration of the amount and type of pigment present in the grind portion and is selected so as to provide good dispersion of the pigment constituent in the grind portion. Generally, the dispersant resin will range in concentration from as low as about 1% up to about 5% by weight of the liquid coating composition with amounts of about 2% to about 3% by weight being typical. Concentrations in excess of about 5% by weight are generally not desirable because such increased amounts incorporated in the final dried film tend to cause the film to become too soft and/or moisture sensitive in some instances. The optimum concentration employed will vary depending upon the type or types of pigments employed in consideration of their particle size and surface area. For example, when carbon black is employed as a major pigment constituent which is of extremely small particle size and high surface area, the dispersant resin is desirably employed in amounts approaching the upper limit of the permissible range to achieve good dispersability.

It will be apparent from the foregoing that the several essential ingredients comprising the liquid pigmented coating composition can be employed in varying amounts to achieve a liquid coating composition of the desired characteristics. Typically, the liquid coating composition will contain about 55% by weight of the waterborne solvent including coalescing agent; about 8% by weight of the acrylic hydrosol particles; about 2% by weight of the dispersant resin and about 35% by weight of the particulated solid pigment.

In addition to the foregoing, the coating composition may further contain optional ingredients of the various types conventionally employed in such waterborne coating formulations. For example, rheology agents of the types well known in the art, but which are of a surfactant-free nature can be employed in normal amounts. Additionally, foam suppressant agents can also be employed as required for processing the grind portion of the coating formulation.

In accordance with the process aspects of the present invention, a stable pigmented waterborne acrylic hydrosol coating composition is prepared which is substantially devoid of any surfactant-type dispersants and/or emulsifying agents achieving thereby an improved coating composition producing a polymeric film of improved physical and chemical properties. The process includes the addition of an aqueous soluble salt of a dispersant polymer having acid functionality to the grind portion of the coating composition which is milled until a substantially uniform stable and fine dispersion is obtained. Thereafter, the letdown portion of the coating formulation comprising the acrylic hydrosol, additional solvent, if desired, and a rheology agent as an optional ingredient is added and blended with the grind portion. The resultant liquid coating composition is eminently satisfactory for use as a primer coating on bare metal surfaces, as a sealer coating over previously painted surfaces, as an undercoating for a subsequent topcoat as well as a decorative and/or unitary coating by itself.

In order to further illustrate the benefits and advantages of the present invention, the following examples are provided. It will be understood that the examples are provided for illustrative purposes and are not intended to be limiting of the scope of the present invention as herein described and as set forth in the subjoined claims.

EXAMPLE I

An acrylic hydrosol suitable for use in the formulation of a coating composition of the present invention is prepared by providing a reactor which is preferably purged with nitrogen prior to the addition of a mixture comprising 233.7 grams diacetone alcohol and 26 grams isopropanol. A monomer mixture is prepared by mixing together 315.9 grams methyl methacrylate, 254.1 grams ethyl acrylate, 30 grams acrylic acid and 4.6 grams benzoyl peroxide. About 10% of the monomer mixture is added to the reactor and the resultant mixture is heated to reflux at about 195° F. with the nitrogen purge gas off. The mixture is held at reflux for a period of about 20 to about 30 minutes. When the temperature of the reaction mixture attains about 240° F., the balance of the monomer mixture is added slowly over a period of three hours while reflux is maintained at a temperature of from about 243° F. to about 248° F. Upon completion of the addition of the monomer mixture, the reaction mass is held at temperature for an additional 10 minute period.

Thereafter, a mixture comprising 1 gram of t-butyl perbenzoate and 2 grams diacetone alcohol is added to the reaction mass which is held at reflux temperature for a period of one-half hour at a temperature of from about 253° F. to about 255° F. Thereafter, a second mixture of 0.66 grams t-butyl perbenzoate and 2.5 grams diacetone alcohol are added to the reaction mass which is held for a period of one additional hour. The reactor is thereafter cooled to provide a reaction mass at a temperature of about 165° F. in order to reduce foaming during the next process step. Thereafter, a mixture comprising 14.7 grams of an aqueous 29% ammonia solution and 70.6 grams of deionized water is added over a period of 15 minutes in the presence of agitation. An additional quantity of 1,061.7 grams of deionized water is preheated to a temperature of 140° F. The reaction mass is added to the preheated water over a period of 30 minutes in the presence of good agitation. The resultant acrylic hydrosol is cooled and is further characterized as containing about 30% by weight nonvolatiles dispersed in a waterborne solvent comprising about 54.25% by weight water, about 14.18% by weight diacetone alcohol and about 1.57% by weight isopropanol.

EXAMPLE II

A waterborne pigmented acrylic hydrosol coating formulation of a grey color suitable for use as a primer and/or surfacer coating is prepared by adding to a pebble mill as a grind portion 325.7 pounds water, 5.13 pounds of a 28% ammonium hydroxide solution; 37.13 pounds of an acrylic dispersant solution (Synthemul 40-425); 312.12 pounds of talc pigment (Baker A3); 17.77 pounds of a silica pigment (Aerosil R972); 27.26 pounds of titanium dioxide pigment (TIpure R960); 3.16 pounds of lamp black pigment (Raven 16); 3.16 pounds of a yellow oxide pigment (201 ED yellow oxide); and 2.17 pounds of a foam suppressant agent (Foamaster R). The resultant grind portion is milled for a period of 44 hours in the pebble mill.

Thereafter, 322.4 pounds of the acrylic hydrosol prepared in accordance with Example I; 19.35 pounds water and 4.62 pounds of a rheology agent comprising a water insoluble polyurethane resin (QR708 rheology modifier) are added and the grind portion and letdown portion are mixed in the mill for an additional 2 hour period.

EXAMPLE III

Bare steel test panels were spray coated with the acrylic hydrosol coating composition prepared in accordance with Example II to provide a primer/surfacer coating. After allowing the coating to dry to the touch at ambient temperatures, the test panels were scuff sanded with 400 grit sandpaper and spray coated with a commercial automotive quality acrylic lacquer. For comparison purposes, bare steel test panels were spray coated with a conventional commercial automotive quality primer/surfacer coating based on nitrocellulose, dried to touch at ambient temperatures, scuff sanded with 400 grit paper and spray coated with the identical acrylic lacquer described above.

All test panels prepared in the aforesaid manner were scribed vertically from top to bottom with a knife, ensuring that the knife penetrated the acrylic lacquer topcoats, primer coats and scribing the steel beneath. After scribing, the panels were placed in a 5% salt fog environment heated to a temperature of 120° F. in accordance with the general ASTM B 117-85 test procedure.

The panels undercoated with the hydrosol primer/surfacer prepared in accordance with Example II in accordance with the present invention and overcoated with the acrylic lacquer were free of rust after 300 hours continuous exposure to the aforesaid environment. The panels undercoated with the conventional commercial automotive quality primer/surfacer and overcoated with the acrylic lacquer evidenced rust deposits extending ½ inch from the scribe line at the conclusion of 96 hours exposure.

These comparative tests clearly demonstrate the superior corrosion protection afforded by the coating composition of the present invention.

EXAMPLE IV

An acrylic hydrosol coating prepared in accordance with Example II was applied over an underlaying surface comprised of an ambient cured enamel coating of automotive quality without lifting or disturbing the underlaying coating. It has been observed that once the hydrosol coating is dry to the touch, at ambient temperatures, it can be further overlaid with acrylic coatings or other coatings containing lacquer dissolving solvents without lifting or disturbing the underlaying coatings. Thus the acrylic hydrosol coating prepared in accordance with Example II forms an effective barrier coating when dry.

Application of a conventional nitrocellulose-based commercial automotive quality primer/surfacer over an ambient cured enamel coating of automotive quality has been observed to lift, raise or otherwise disturb the enamel coating rendering the surface unfit for further procesing.

EXAMPLE V

A waterborne pigmented acrylic hydrosol coating of a white color suitable for use as a decorative coating is prepared by adding to a pebble mill as a grind portion 190.44 pounds of deionized water; 3.26 pounds of a 28% ammonium hydroxide solution; 23.62 pounds of an acrylic dispersant solution (Synthemul 40-425); 231.28 pounds of titanium dioxide (TI pureR960); and 1.37 pounds of a foam suppressant agent (Foamaster R). The resultant grind portion is milled for a period of 16 hours in a pebble mill.

Thereafter, 118.66 additional pounds of the acrylic dispersant resin (Synthemul 40-425) and 1233.53 pounds of the acrylic hydrosol prepared in accordance with Example I are added and the grind portion and letdown portion are mixed in the mill for an additional 1 hour period.

The resultant white colored coating composition was spray applied to bare steel test panels and dried at ambient temperatures. The resultant dried film evidenced no flash rusting of steel substrate and possessed excellent adhesion and good appearance.

EXAMPLE VI

A waterborne pigmented acrylic hydrosol coating formulation of a black color suitable for use as an industrial color coating is prepared by adding to a pebble mill as a grind portion 254.44 pounds of deionized water; 4.36 pounds of a 28% ammonium hydroxide solution; 190.28 pounds of an acrylic dispersant solution (Synthemul 40-425); 47 pounds of lamp black (Raven 16); and 1.37 pounds of a foam suppressant agent (Foamaster R). The resultant grind portion is milled for a period of 36 hours in a pebble mill. Thereafter, 1649.10 pounds of the acrylic hydrosol prepared in accordance with Example I are added and the grind portion and letdown portion are mixed in the mill for an additional hour.

The resultant black colored coating composition was spray applied to bare steel test panels and dried at ambient temperatures. The resultant dried film evidenced no flash rusting of the steel substrate and possessed excellent adhesion and good appearance.

EXAMPLE VII

The Volatile Organic Content (VOC) contained in the waterborne acrylic hydrosol coating composition prepared in accordance with Example VI as measured in accordance with the method prescribed by the Federal Environmental Protection Agency is 1.3 pounds/gallon of coating composition as applied. The VOC of the coating composition of the present invention is only about 20% in comparison to the VOC of conventional organic solventborne commercial automotive quality black acrylic coating compositions.

While it will be apparent that the invention herein described is well calculated to achieve the benefits and advantages set forth above, it will be appreciated that the invention is susceptible to modification, variation and change without departing from the spirit thereof.

What is claimed is:

1. A waterborne pigmented coating composition comprising one or a combination or mixture of substantially uniformly dispersed pigment particles, a film forming constituent comprising a mixture of uniformly dispersed acrylic hydrosol particles and an aqueous soluble salt of a thermosettable dispersant polymer having acid functionality, the aqueous soluble salt having a volatile substituent, and a liquid constituent comprising a mixture of water and organic solvents, the organic solvents functioning as coalescing agents for the film forming constituents whereby the resulting composition is substantially free of surfactants and emulsifiers.

2. The coating composition as defined in claim 1 in which said liquid constituent comprises from about 35% to about 65% by weight of said composition.

3. The coating composition as defined in claim 1 in which said acrylic hydrosol particles are of colloidal dimensions.

4. The coating composition as defined in claim 1 in which said acrylic hydrosol particles are present in an amount of about 5% to about 40% by weight of said compositions.

5. The coating composition as defined in claim 1 in which said dispersant polymer is present in an amount of about 1% to about 5% by weight of said composition.

6. The coating composition as defined in claim 1 in which said water soluble salt comprises the reaction product of said dispersant polymer having acid functionality and a basic compound selected from the group consisting of ammonia, an organic amine as well as mixtures thereof.

7. The coating composition as defined in claim 1 in which said dispersant polymer is an acrylic polymer.

* * * * *